(12) United States Patent
Ohshitanai et al.

(10) Patent No.: US 11,495,005 B2
(45) Date of Patent: Nov. 8, 2022

(54) IMAGE SENSOR AND CONTROL METHOD THEREOF, AND IMAGE CAPTURING APPARATUS AND CONTROL METHOD THEREOF

(71) Applicant: CANON KABUSHIKI KAISHA, Tokyo (JP)

(72) Inventors: Kazuki Ohshitanai, Kanagawa (JP); Hideki Ikedo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 17/184,012

(22) Filed: Feb. 24, 2021

(65) Prior Publication Data
US 2021/0271915 A1 Sep. 2, 2021

(30) Foreign Application Priority Data
Feb. 27, 2020 (JP) .............................. JP2020-032191

(51) Int. Cl.
| H04N 5/345 | (2011.01) |
| G06V 10/147 | (2022.01) |
| H04N 5/378 | (2011.01) |
| G06N 3/04 | (2006.01) |
| G06K 9/62 | (2022.01) |
| G06V 10/10 | (2022.01) |
| G06V 10/22 | (2022.01) |
| G06V 10/40 | (2022.01) |

(52) U.S. Cl.
CPC ........... *G06V 10/147* (2022.01); *G06K 9/623* (2013.01); *G06N 3/04* (2013.01); *G06V 10/10* (2022.01); *G06V 10/22* (2022.01); *G06V 10/40* (2022.01); *H04N 5/3456* (2013.01); *H04N 5/378* (2013.01)

(58) Field of Classification Search
CPC .................................................. H04N 5/3456
USPC .......................................................... 348/302
See application file for complete search history.

(56) References Cited

U.S. PATENT DOCUMENTS

2008/0226170 A1* 9/2008 Sonoda .............. H04N 5/23277
382/173

FOREIGN PATENT DOCUMENTS

JP 2018-125842 A 8/2018

* cited by examiner

*Primary Examiner* — Joel W Fosselman
(74) *Attorney, Agent, or Firm* — Cowan, Liebowitz & Latman, P.C.

(57) ABSTRACT

An image sensor comprises a pixel array having a plurality of pixels arranged in a matrix, a readout unit that controls readout of signals from the plurality of pixels, an output unit that outputs the read signals as an image signal and an extraction unit that performs feature amount extraction processing to extract a feature amount using the read signals. The readout of the signals by the readout unit and the feature amount extraction processing by the extraction unit are processed in parallel.

24 Claims, 6 Drawing Sheets

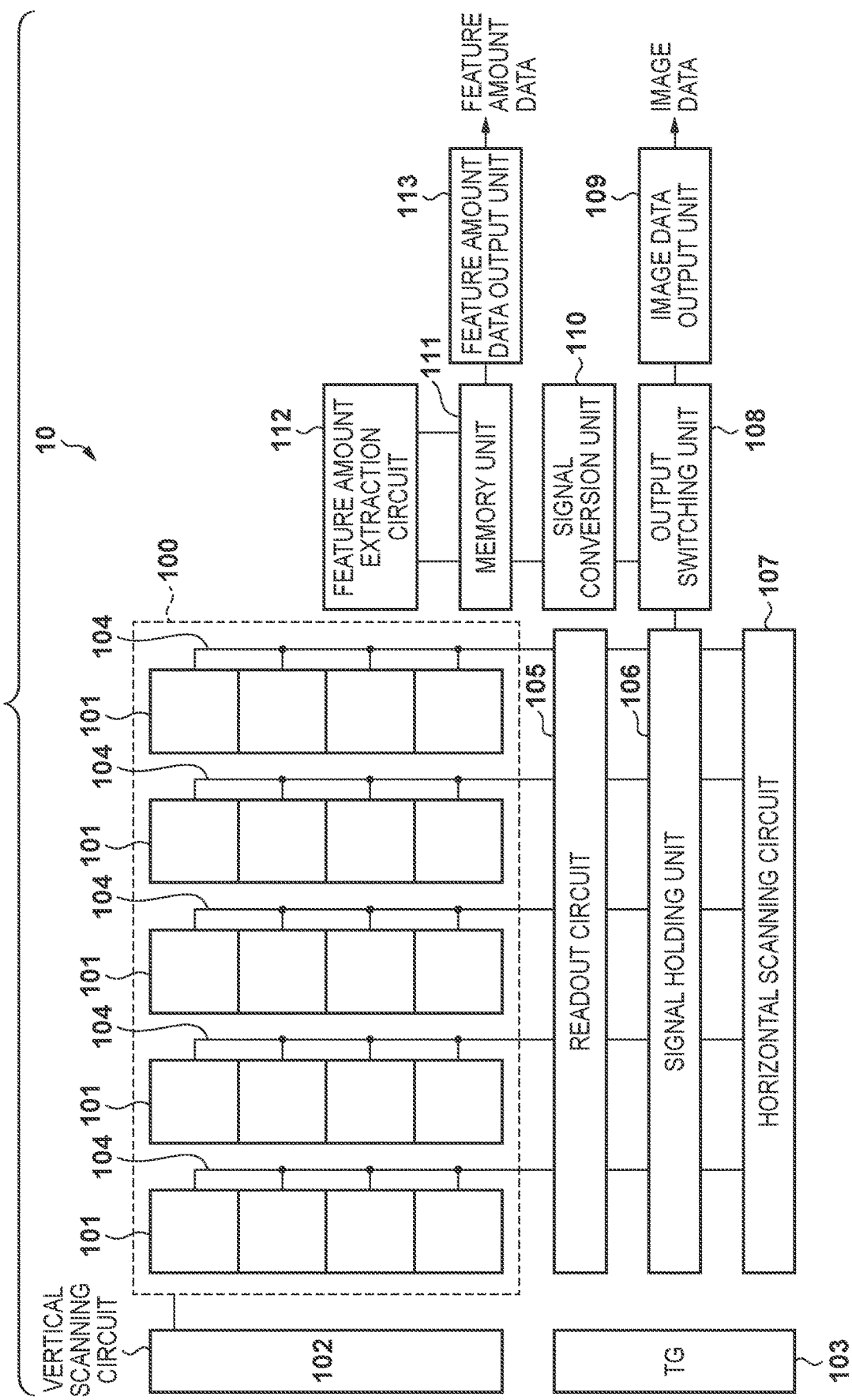

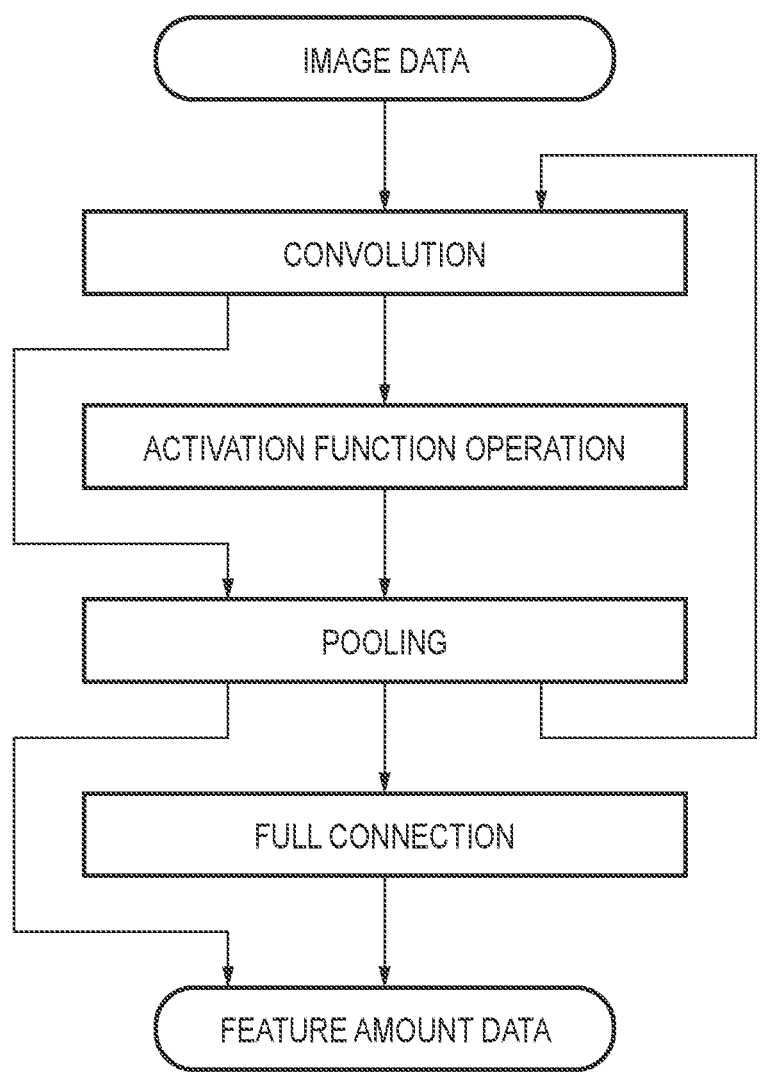

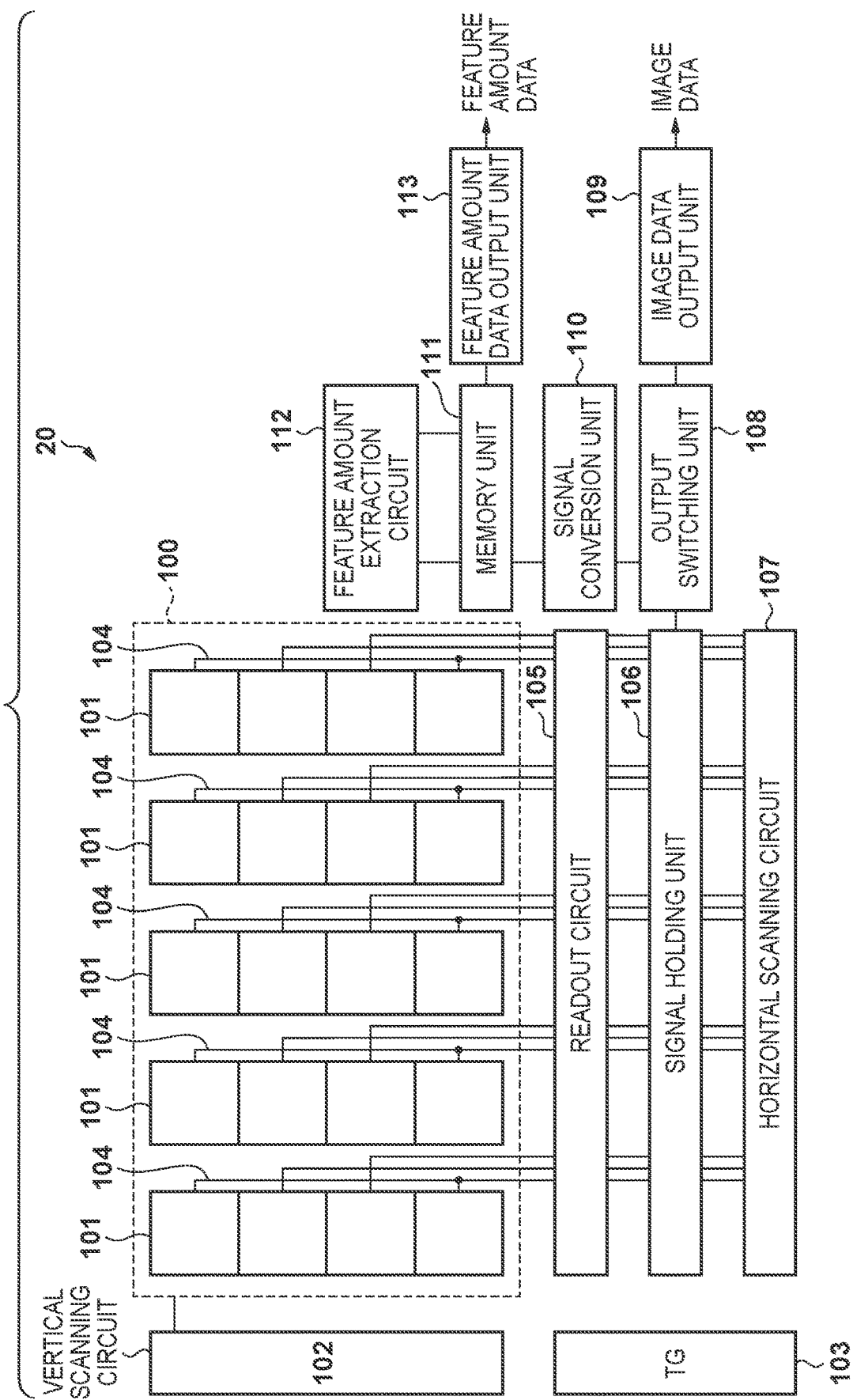

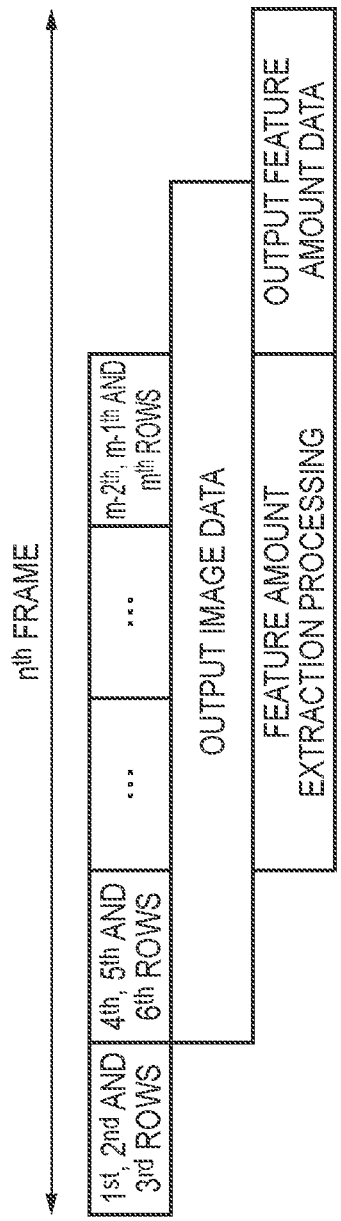
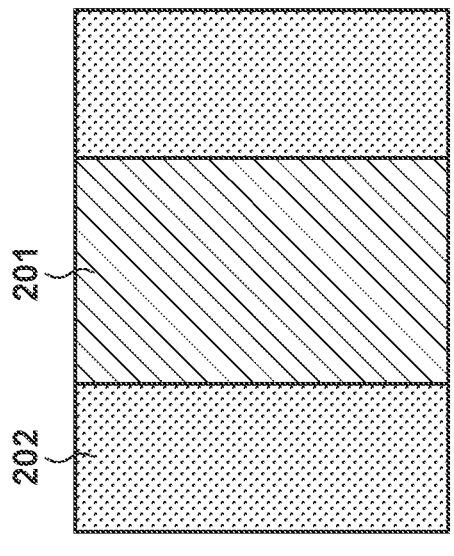
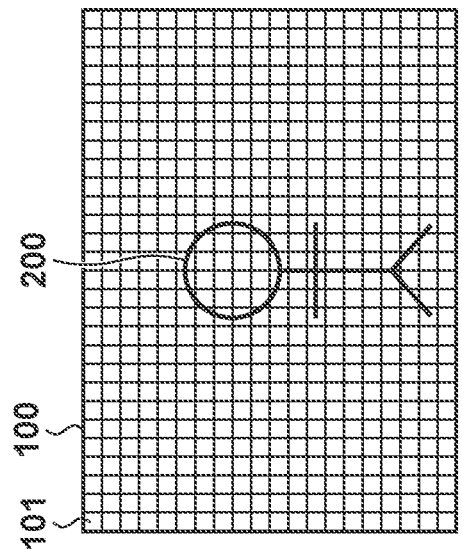

IMAGE SENSOR AND CONTROL METHOD THEREOF, AND IMAGE CAPTURING APPARATUS AND CONTROL METHOD THEREOF

BACKGROUND OF THE INVENTION

Field of the Invention

The present invention relates to an image sensor and control method thereof, and an image capturing apparatus and control method thereof, and more particularly to a technique for reading an image signal and extracting image features.

Description of the Related Art

In recent years, deep learning technology has been used in the field of image recognition. For example, there is a technique for extracting a feature amount of captured image data by using, for example, convolutional neural network (CNN).

Japanese Patent Laid-Open No. 2018-125842 discloses an image capturing apparatus in which a part of the convolution processing in CNN is performed in an image sensor chip. As an example, in Japanese Patent Laid-Open No. 2018-125842, product-sum calculation is performed by adding and reading out signals of pixels in each pixel block wherein each pixel is set to a desired sensitivity in accordance with a filter used for the convolution processing.

However, in the image capturing apparatus described in Japanese Patent Laid-Open No. 2018-125842, since the sensitivity is changed for each pixel and the processing of adding and reading the signals from the pixels is performed, the quality of an image will not be sufficient for appreciation if the image is generated from the read signals.

Further, in a case where the image signal for one frame is read out from the image sensor and then a feature amount is extracted from the read image signal, there is a problem that, if the obtained feature amount is used for shooting the next frame or for the next feature amount extraction processing, the frame rate decreases.

SUMMARY OF THE INVENTION

The present invention has been made in consideration of the above situation, and performs the image signal readout and feature extraction processing efficiently.

According to the present invention, provided is an image sensor comprising: a pixel array having a plurality of pixels arranged in a matrix; a readout unit that controls readout of signals from the plurality of pixels; an output unit that outputs the read signals as an image signal; and an extraction unit that performs feature amount extraction processing to extract a feature amount using the read signals, wherein the readout of the signals by the readout unit and the feature amount extraction processing by the extraction unit are processed in parallel, and wherein each unit is implemented by one or more processors, circuitry or a combination thereof.

Further, according to the present invention, provided is an image capturing apparatus comprising: an image sensor including: a pixel array having a plurality of pixels arranged in a matrix; a readout unit that controls readout of signals from the plurality of pixels; an output unit that outputs the read signals as an image signal; and an extraction unit that performs feature amount extraction processing to extract a feature amount using the read signals; and a signal processing unit that processes signals output from the image sensor, wherein the readout of the signals by the readout unit and the feature amount extraction processing by the extraction unit are processed in parallel, and wherein each unit is implemented by one or more processors, circuitry or a combination thereof.

Furthermore, according to the present invention, provided is an image capturing apparatus comprising: an image sensor including: a pixel array having a plurality of pixels arranged in a matrix; a readout unit that controls readout of signals from the plurality of pixels; and an output unit that outputs the read signals as an image signal; and an extraction unit that performs feature amount extraction processing to extract a feature amount using the read signals, wherein the readout of the signals by the readout unit and the feature amount extraction processing by the extraction unit are processed in parallel, and wherein each unit is implemented by one or more processors, circuitry or a combination thereof.

Further, according to the present invention, provided is a method of controlling an image sensor including a pixel array having a plurality of pixels arranged in a matrix, a readout unit that controls readout of signals from the plurality of pixels, an output unit that outputs the read signals as an image signal, and an extraction unit that performs feature amount extraction processing to extract a feature amount using the read signals, the method comprising controlling to perform the readout of the signals by the readout unit and the feature amount extraction processing by the extraction unit in parallel.

Further, according to the present invention, provided is a control method of an image capturing apparatus having an image sensor including a pixel array having a plurality of pixels arranged in a matrix, a readout unit that controls readout of signals from the plurality of pixels and an output unit that outputs the read signals as an image signal, and an extraction unit that performs feature amount extraction processing to extract a feature amount using the read signals, the method comprising controlling to perform the readout of the signals by the readout unit and the feature amount extraction processing by the extraction unit in parallel.

Further, according to the present invention, provided is a non-transitory computer-readable storage medium, the storage medium storing a program that is executable by the computer, wherein the program includes program code for causing the computer to perform a control method of controlling an image sensor including a pixel array having a plurality of pixels arranged in a matrix, a readout unit that controls readout of signals from the plurality of pixels, an output unit that outputs the read signals as an image signal, and an extraction unit that performs feature amount extraction processing to extract a feature amount using the read signals, the method comprising controlling to perform the readout of the signals by the readout unit and the feature amount extraction processing by the extraction unit in parallel.

Further, according to the present invention, provided is a non-transitory computer-readable storage medium, the storage medium storing a program that is executable by the computer, wherein the program includes program code for causing the computer to perform a control method of controlling an image capturing apparatus having an image sensor including a pixel array having a plurality of pixels arranged in a matrix, a readout unit that controls readout of signals from the plurality of pixels and an output unit that outputs the read signals as an image signal, and an extraction unit that performs feature amount extraction processing to extract a feature amount using the read signals, the method comprising controlling to perform the readout of the signals by the readout unit and the feature amount extraction processing by the extraction unit in parallel.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing a schematic configuration of an image sensor according to a first embodiment of the present invention;

FIG. 2 is a flowchart showing an example of feature amount extraction processing according to the first embodiment;

FIG. 5 is a block diagram showing a schematic configuration of an image sensor according to a second embodiment;

FIG. 6 is a diagram showing timings of pixel signal readout operation and the feature amount extraction processing according to the second embodiment;

FIGS. 7A and 7B are diagrams showing an example when different settings are made for each region according to a third embodiment.

DESCRIPTION OF THE EMBODIMENTS

Figure 3A:
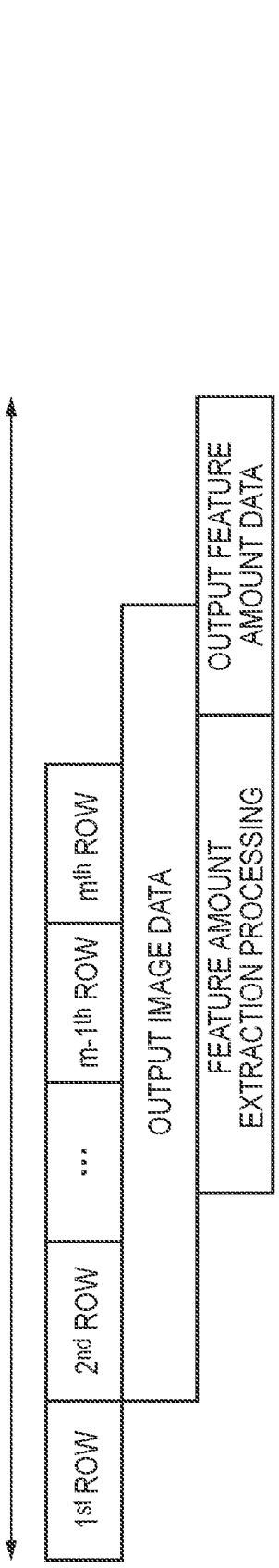
FIG. 3A is a diagram showing timings of pixel signal readout operation and the feature amount extraction processing according to the first embodiment.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram showing a schematic configuration of an image sensor 10 according to a first embodiment of the present invention.

A pixel array 100 is comprised of a plurality of pixels 101 arranged in a matrix. Although the pixel array 100 is represented by pixels 101 of 5 rows×4 columns in FIG. 1, in reality, the pixels 101 of over thousands of rows and thousands of columns are arranged.

A vertical scanning circuit 102 sequentially scans the pixels 101 by row or by a plurality of rows in each HD based on a horizontal synchronization signal (HD) period output from a timing generator (TG) 103. In this way, the image signal for one frame can be obtained by sequentially scanning the pixel array 100 in unit of row.

For example, when the pixel array 100 is composed of m rows of pixels 101 and sequentially scanned one row per one HD period, it takes time of m×HD to read out the pixel signals for one frame. Under the control of vertical scanning circuit 102, from each pixel 101, a noise signal, which is an analog signal of noise level, and a photoelectric conversion signal, which is an analog signal based on charge generated by performing photoelectric conversion of incident light, are output via vertical signal lines 104 each provided for each column.

A readout circuit 105 has a plurality of A/D converters each provided for each column corresponding to each vertical signal line 104, and A/D-converts analog signals read from the pixels 101 via the vertical signal lines 104 to digital signals. Further, the readout circuit 105 may include a current supply unit that supplies a current to the pixels 101 via the vertical signal lines 104, memory units that temporarily hold analog signals, column amplifier units that amplify the analog signals from the pixels 101, and so forth.

A signal holding unit 106 holds the signals of the respective columns output from the readout circuit 105. A horizontal scanning circuit 107 sequentially scans the signal holding unit 106 to sequentially transfer the signals of the respective columns held in the signal holding unit 106 to an output switching unit 108.

The output switching unit 108 outputs the signal of each column output from the signal holding unit 106 to an image data output unit 109 or a signal conversion unit 110 while switching the destination of the signal.

The image data output unit 109 processes the signals of the respective columns output from the signal holding unit 106, and outputs the processed signals as image data to the outside of the image sensor 10.

The signal conversion unit 110 converts the signals of the respective columns output from the signal holding unit 106 into signals suitable for extracting a feature amount, and outputs the converted signals to a memory unit 111. Examples of the conversion process performed here include, for example, changing the number of bits of the digital signal converted by the A/D conversion and changing the resolution, but the conversion process is not limited thereto.

A feature amount extraction circuit 112 performs a feature amount extraction processing on the signals held in the memory unit 111, and outputs the processed signal to the memory unit 111. The feature amount extraction processing performed by the feature amount extraction circuit 112 will be described later with reference to FIG. 2.

A feature amount data output unit 113 outputs the signal obtained by the feature amount extraction processing and held in the memory unit 111 to the outside of the image sensor 10 as the feature amount data. This feature amount data can be used, for example, for discriminating a subject and identifying a subject.

A timing generator (TG) 103 provides timing signals to each of the vertical scanning circuit 102, readout circuit 105, signal holding unit 106, horizontal scanning circuit 107, output switching unit 108, image data output unit 109, signal conversion unit 110, memory unit 111, feature amount extraction circuit 112, and feature amount data output unit 113.

Next, the feature amount extraction processing performed in the feature amount extraction circuit 112 will be described with reference to FIG. 2. In this embodiment, a case where a convolutional neural network is used in the feature amount extraction processing will be described.

In a convolutional neural network, a convolution layer and a pooling layer are mainly used. In the convolution layer, the sum of the products of the elements each between the data called the kernel (or filter) and the data of the same size (window) as the kernel, which is a part of the image data, is calculated to be converted into one numerical value. This conversion process is performed while sliding the window little by little.

If the kernel and image data are similar data, the calculated sum of the products will be high, so the feature amount of the image can be extracted. In this process, a desired feature amount can be extracted by applying one of various kernels corresponding to the feature amount to be extracted.

The pooling layer has a window similar to the convolution layer, and statistical processing of applying the kernel to the entire image is performed. For example, a Max pooling layer takes the maximum value in the kernel, and the Average pooling layer takes the average value of the image values in the kernel.

Further, after the convolution layer, the activation function may be applied. For example, there are Rectified Liner Units that leave positive data as is and replace negative data less than 0 with 0.

Feature data is generated by repeating the convolution layer, activation function operation, and pooling layer an arbitrary number of times. The generated feature amount data is made into one-dimensional data by a fully connected layer and output from the feature amount data output unit 113 to the outside of the image sensor 10. It should be noted that the feature amount data may be output to the outside from the feature amount data output unit 113 without passing through the fully connected layer.

In this way, convolution, activation function operation, pooling, and full connection are executed on the input image data, and the feature amount data representing the extracted feature amount is formed.

FIG. 3A is a diagram showing timings of readout operation of pixel signals from the pixel array 100 and the feature amount extraction processing in an arbitrary frame ($n^{th}$ frame) in the first embodiment. In the following explanation, it is assumed that the kernel (filter) used in the feature amount extraction circuit 112 has a size of 3×3, the number of rows of the pixel array 100 is m, and the pixel signals are sequentially read out from the pixels 101 row by row by the rolling shutter method.

At the beginning of the frame, the pixel signals are read out from the pixels 101 in the first row of the pixel array 100, and the pixel signals converted into digital signals in the readout circuit 105 are held in the signal holding unit 106.

After the readout of the pixel signals of the first row is completed, in parallel with the readout of the pixel signals of the second row, the pixel signals of the first row held in the signal holding unit 106 are output to the outside of the image sensor 10 as image data from the image data output unit 109 via the output switching unit 108. In addition, the pixel signals of the first row held in the signal holding unit 106 are also input to the signal conversion unit 110 via the output switching unit 108, converted into signals suitable for the feature amount extraction processing, and held in the memory unit 111.

Subsequently, in parallel with the readout of the pixel signals of the third row, the pixel signals of the second row held in the signal holding unit 106 are output to the outside of the image sensor 10 as image data from the image data output unit 109 via the output switching unit 108. In addition, the pixel signals of the second row held in the signal holding unit 106 are also input to the signal conversion unit 110 via the output switching unit 108, converted into signals suitable for the feature amount extraction processing, and held in the memory unit 111.

Further, in parallel with the readout of the pixel signals of the fourth row, the pixel signals of the third row held in the signal holding unit 106 are output to the outside of the image sensor 10 as image data from the image data output unit 109 via the output switching unit 108. In addition, the pixel signals of the third row held in the signal holding unit 106 are also input to the signal conversion unit 110 via the output switching unit 108, converted into signals suitable for the feature amount extraction processing, and held in the memory unit 111. Here, as signals of the same row size as that of the kernel used for the feature amount extraction processing is obtained, the feature amount extraction processing is started.

Similarly, in parallel with the readout of the pixel signals of the fifth row, it is possible to output image data based on the pixel signals of the fourth row and perform the feature amount extraction processing based on the image signals of the second to fourth rows.

After that, the same operation is repeated, and in parallel with the readout of the pixel signals of the $m^{th}$ row, the pixel signals of the $m-1^{th}$ row held in the signal holding unit 106 are output to the outside of the sensor as image data from the image data output unit 109 via the output switching unit 108. In addition, the signals of the $m-1^{th}$ row held in the signal holding unit 106 are also input to the signal conversion unit 110 via the output switching unit 108, converted into signals suitable for the feature amount extraction processing, and held in the memory unit 111. Then, the signals are used for the feature amount extraction processing together with the signals of the $m-3^{th}$ row and the $m-2^{th}$ row.

Further, the pixel signals of the $m^{th}$ row are processed, and the image data and the feature amount data for one frame are output to the outside of the image sensor 10.

In the above description, it is assumed that the feature amount extraction processing is started in the feature amount extraction circuit 112 when the signals of the same number of rows as that of the kernel used for the feature amount extraction processing are held in the memory unit 111. However, the present invention is not limited to this, and the feature amount extraction processing may be started after signals of the number of rows larger than that of the kernel are held in the memory unit 111 before all the signals for one frame are read out. By doing so, even when various kernels of different sizes are used, the feature amount extraction processing can be performed in parallel with the readout of signals.

Further, in the present embodiment, there is a period in which both the image data and the feature amount data are output to the outside of the image sensor 10. At that time, the image data and the feature amount data may be output in parallel, or the image data and the feature amount data may be superimposed and output. This is a cooperative operation that makes use of the configuration in which the feature amount extraction circuit 112 is provided in the image sensor 10.

Figure 3B:
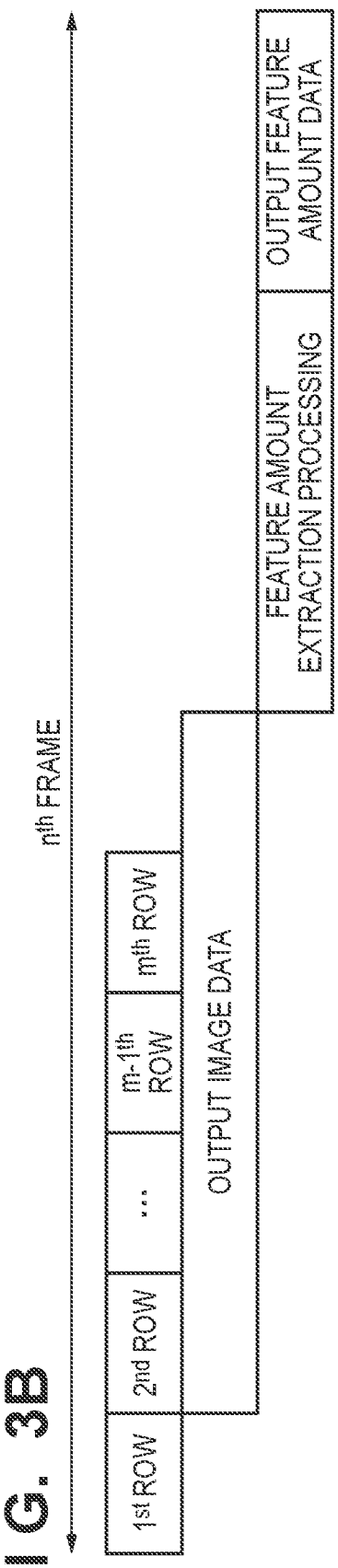
FIG. 3B is a diagram showing an example of timings when the feature amount extraction processing is performed after reading out pixel signals.

FIG. 3B shows timings in a case where the readout of pixel signals and the feature amount extraction processing are not processed in parallel for the purpose of comparison. As can be seen from FIG. 3B, when parallel processing is not performed, the feature amount extraction processing and feature amount data output are performed after the image data of all rows are read out, and it takes a long time after starting the readout of the frame until the feature amount data is obtained. Thus, in a case where it is desired to control the readout and processing of the next signal using the obtained feature data, the frame rate becomes low and timing to start applying the control is delayed.

As described above, according to the first embodiment, by performing readout of the pixel signals and the feature amount extraction processing in parallel, it is possible to perform the readout of pixel signals and the feature amount extraction processing efficiently.

Figure 4:
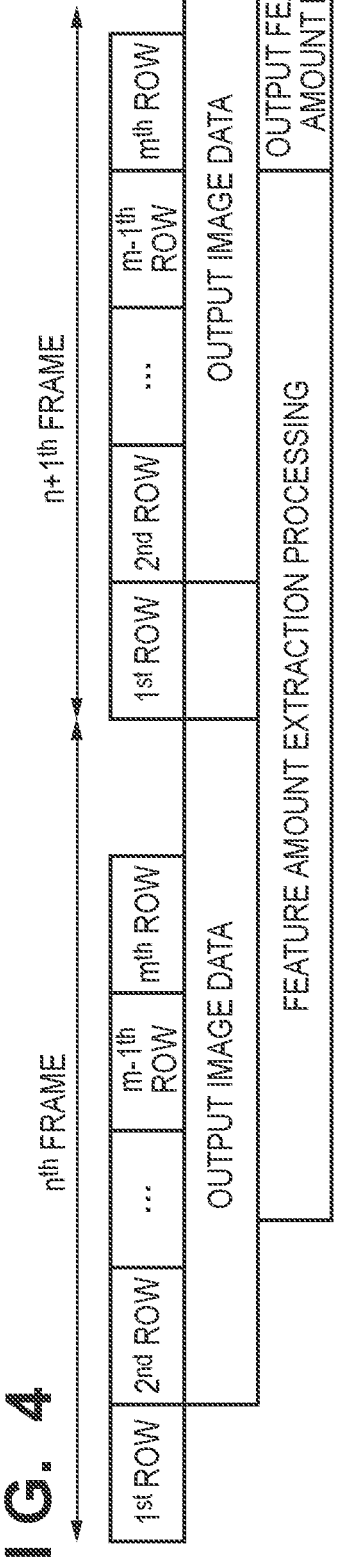
FIG. 4 is a diagram showing different timings of the pixel signal readout operation and the feature amount extraction processing according to the first embodiment.

In the above example, the image data and the feature amount data are output for each frame, but when the calculation scale of the feature amount processing is large, the feature amount data can be output across the frames. The timing of processing in that case is shown in FIG. 4. As shown in FIG. 4, the feature amount extraction processing started in the $n^{th}$ frame ends in the $n+1^{th}$ frame, and in the $n+1^{th}$ frame, the image data of the $n+1^{th}$ frame and the feature amount data of the $n^{th}$ frame are output to the outside of the image sensor 10.

It is also conceivable that the vertical scanning circuit 102 controls the readout of signals from the pixel array 100 by changing the resolution and frame rate between frames. In reading out pixel signals, a technique of adding and averaging pixel signals to read out them is generally known. For example, it may be operated such that adding and averaging of pixel signals are performed in the row direction on the vertical signal line 104, and adding and averaging of the pixel signals are performed in the horizontal direction on the readout circuit 105. Both have a trade-off relationship between resolution and frame rate.

Further, in the feature amount extraction processing, the more types of the kernel are, the smaller the size of the kernel is, and the smaller a slide amount of the kernel is, the higher the accuracy of feature amount extraction becomes.

For example, there is an application in which the presence or absence of a subject is determined from the extracted feature amount, and the subject is identified in detail from the next frame. In that case, when determining the presence or absence of a subject, the number of types of the kernel is reduced and the size of the kernel is increased, so as to reduce the calculation load of the feature amount extraction processing.

When the presence of a subject is determined and the subject is identified, a method such as increasing the number of types of the kernel and reducing the size of the kernel size so as to improve the accuracy of the feature extraction may be used. Further, in a case where it is determined that there is a subject, the resolution may be increased in the next or subsequent frame.

Further, to change the resolution, the signal conversion unit 110 may reduce the resolution. In that case, the input data to the feature extraction circuit has a low resolution, but the image data has a high resolution.

Second Embodiment

Next, a second embodiment of the present invention will be described.

In the first embodiment, the case where the pixel signals are sequentially read out row by row has been described. In the second embodiment, the case where the pixel signals are read out in units of a plurality of rows will be described.

FIG. 5 is a block diagram showing a schematic configuration of an image sensor 20 according to the second embodiment. The difference from the configuration shown in FIG. 1 is that a plurality of vertical signal lines 104 are provided for each column, and the pixel signals of the plurality of rows corresponding to the number of the vertical signal lines 104 are simultaneously read out. Other than that, the configuration is the same as that in FIG. 1, and the description thereof will be omitted. In FIG. 5, as an example, three vertical signal lines 104 are wired in each column, and the pixel signals of three rows are simultaneously read out in each HD period and pixel signals of three rows are held in the memory unit 111.

FIG. 6 is a diagram showing timings of readout operation of pixel signals and the feature amount extraction processing in the second embodiment. FIG. 6 shows a case where the pixel signals of three rows are read out in one HD period as described above. In this case, it is assumed that the size of the kernel is 3×3. Since the size of the kernel has three rows, the feature amount extraction processing can be started when the data of 3 three rows is held in the memory unit 111.

On the other hand, for example, if the number rows of pixel signals read out in one HD period is three and the size of the kernel has five rows, the timing when the feature amount extraction processing can be started is after two HD periods in which six rows of pixel signals are read out. In addition, it is necessary to hold the signals of extra one row in the memory unit 111.

Further, even if the pixel signals of three rows are read in the next HD period, the pixel signals of five rows which are required for the processing cannot be obtained, so it is necessary to wait until the pixel signals of three more rows are read out in the next HD period. In that case, the pixel signals of extra two rows are additionally held in the memory unit 111.

Therefore, by choosing the size of row of the kernel so as to be an integral multiple of the number of rows that the pixel signals are read out in each HD period, the feature amount extraction processing can be started efficiently. Moreover, the circuit scale of the memory unit 111 can be reduced.

In the first and second embodiments described above, the feature amount extraction processing has been described as being performed inside the image sensor 10 or the image sensor 20, but the present invention is not limited to this. For example, if the signal conversion unit and the feature amount extraction circuit are configured outside the image sensor 10 or the image sensor 20, the pixel signals are output outside the image sensor 10 or the image sensor 20, and when more than the number of rows of pixel signals required for the feature amount extraction processing are available, the feature amount extraction processing may be started. That is, regardless of whether the feature amount extraction circuit is provided inside or outside the image sensor 10 or the image sensor 20, by performing the pixel readout processing and the feature amount extraction processing in the image sensor 10 or the image sensor 20 in parallel, it is possible to efficiently perform the readout processing and the feature amount extraction processing.

Third Embodiment

Next, a third embodiment of the present invention will be described.

As described above, the feature amount data extracted by the feature amount extraction circuit 112 can be used for determining the presence or absence of a subject, identifying a subject, and the like. In the third embodiment, a case will be described in which, for example, an image is divided into a region or regions including a subject and a region or regions not including a subject by using the feature amount data, and different feature amount extraction processing is performed between these regions.

FIG. 7A is a schematic view in which the pixel array 100 and a subject 200 are superimposed, and FIG. 7B is a diagram showing regions on which different types of feature amount extraction processing are performed. When it is detected that there is a subject 200 as shown in FIG. 7A by using the feature amount data, in the area of the pixel array 100, a subject area 201 corresponding to the subject 200 and non-subject areas 202 corresponding to subjects other than the subject 200 are set as shown in FIG. 7B.

Then, in the third embodiment, different types of feature amount extraction processing are performed on the subject area 201 and the non-subject areas 202, and the feature amount data are output. As the different type of feature amount extraction processing, for example, as for the convolution layer, it is conceivable to change the type of kernel, the size of kernel, a slide amount of kernel, and the like. Further, for example, as for the pooling layer, it is conceivable to use a max pooling method, an average pooling method, and the like.

Specifically, in the subject area 201, more types of kernels are used, a smaller size of kernel is used, and a smaller slide amount of kernel is used than in the non-subject areas 202, thereby improving the accuracy of extracting the feature amount of the subject.

Further, the priority of the order of the feature amount extraction processing may be changed between the subject area 201 and the non-subject areas 202. For example, the feature amount extraction processing is performed on the subject area 201 prior to the non-subject areas 202.

Further, pixel signals may be read out from the pixel array 100 by using different readout methods between the subject area 201 and the non-subject areas 202. For example, the different readout methods include to use different thinning rates, the different numbers of rows or columns for adding and averaging pixel signals, different frame rates, and so forth.

Here, the thinning rate refers to the ratio of the number of pixels to be read out for obtaining the pixel signal to the total number of pixels in an area. For example, when the thinning rate of a certain pixel area is 1, it means that the pixel signal is read out from all the pixels in the pixel area. When the thinning rate of a certain pixel area is 0.25, it means that the pixel signal is read out from ¼ of the pixels in the pixel area. Therefore, the larger the thinning rate, the clearer the captured subject 200 can be exhibited.

Further, the addition averaging number represents the number of pixels to be added and averaged when the pixel signals of pixels adjacent to each other in the row direction and the column direction are added and averaged. Such addition averaging processing is performed, for example, by mixing pixel signals of the adjacent pixels 101 in a vertical signal line 104. By performing such addition averaging processing on the pixel signals of adjacent pixels, a similar effect as an effect of the process of reading out the pixel signals of the pixels by thinning out at a certain thinning rate can be obtained.

Therefore, in the subject area 201, the thinning rate and the like are made larger and the number of rows and columns to be added and averaged is made smaller than in the non-subject areas 202.

The frame rate represents the number of frames read per unit time. The higher the frame rate is, the smoother the movement of the subject 200 becomes and the less likely the image blur will occur. Therefore, a frame rate (the number of times the pixel signal is read) is made higher in the subject area 201 than in the non-subject areas 202.

Further, when the subject 200 is recognized, the feature amount extraction circuit 112 may form marking data for adding a frame around the partial image corresponding to the subject 200. In that case, the marking data is output to the outside of the sensor together with the image data or the feature amount data.

As described above, according to the third embodiment, comparing to a case where the same feature amount extraction processing is performed on all areas, it is possible to reduce the feature amount extraction time and the amount of the feature amount data by reducing the calculation load of the feature amount extraction processing for the non-subject areas 202 not including the subject 200.

Fourth Embodiment

Next, a fourth embodiment of the present invention will be described.

Figure 8:
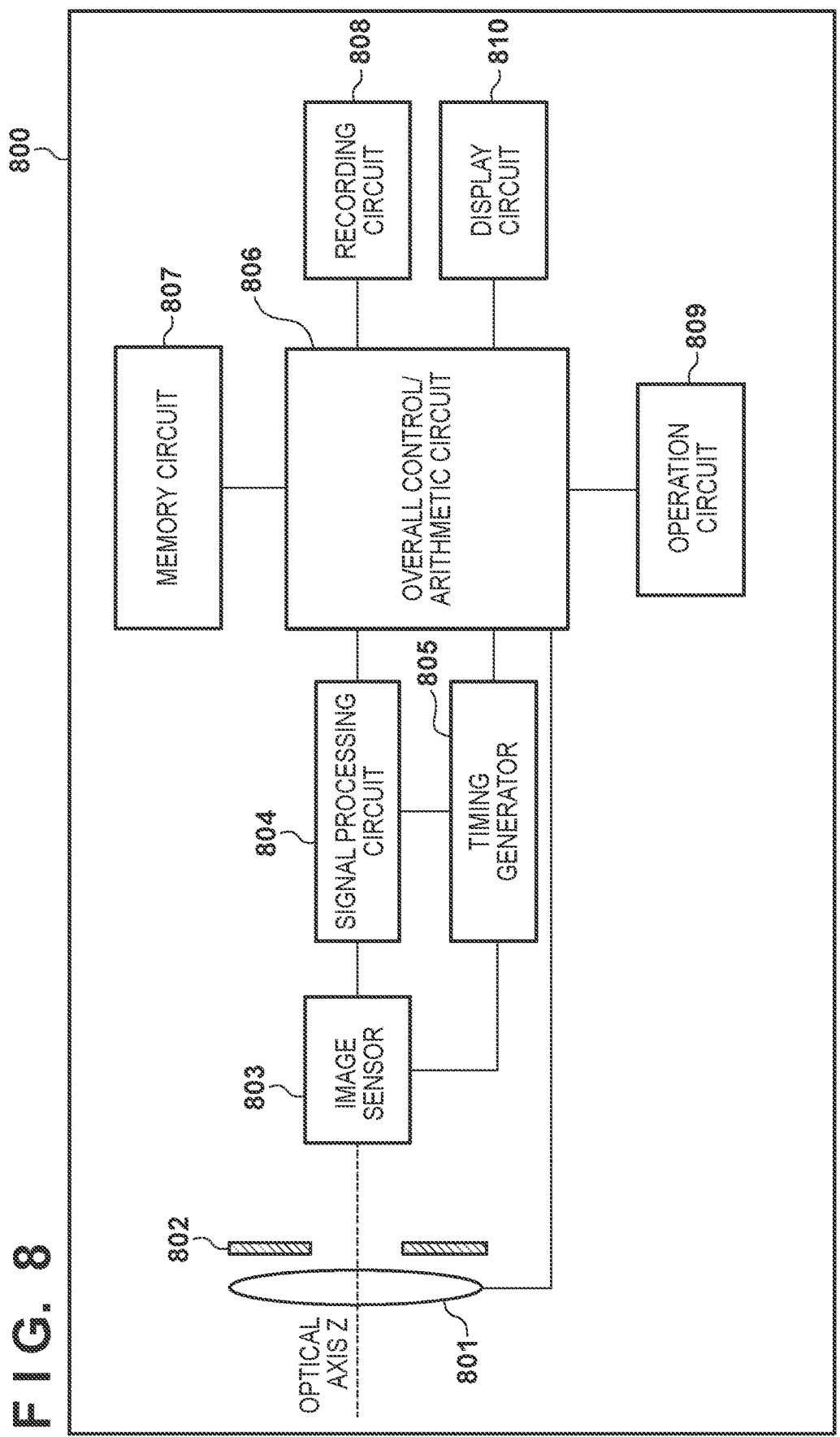
FIG. 8 is a block diagram showing an overall configuration of an image capturing apparatus according to a fourth embodiment.

FIG. 8 is a block diagram showing a schematic configuration of an image capturing apparatus 800 (digital camera, dashboard camera, smartphone, etc.) according to the fourth embodiment.

In FIG. 8, an imaging optical system of an image capturing apparatus 800 includes an imaging lens 801 and a diaphragm 802. The light that has passed through the imaging lens 801 and the diaphragm 802 is formed on an imaging surface of an image sensor 803 arranged near the focal position of the imaging lens 801. Although the imaging lens 801 is shown as a single lens, it is actually composed of a lens group including a plurality of lenses. The image sensor 803 has a function of capturing a subject image formed by the imaging lens 801 as a signal. In the present embodiment, the image sensor 803 has the configuration of the image sensor 10 or the image sensor 20 described in the first or second embodiment, respectively.

A signal processing circuit 804 performs various corrections such as signal amplification and reference level adjustment, rearrangement of data, and the like on the signal output from the image sensor 803. Note that part of signal processing functions such as reference level adjustment may be provided in the image sensor 803. On the contrary, it may be configured such that the processing performed in the feature amount extraction circuit 112 configured in the image sensor 10 or the image sensor 20 is performed by the signal processing circuit 804.

A timing generator 805 outputs the drive timing signals to the image sensor 803 and the signal processing circuit 804.

An overall control/arithmetic circuit 806 performs overall drive and control of the entire image capturing apparatus 800 including the image sensor 803 and the signal processing circuit 804. In addition, the overall control/arithmetic circuit 806 performs predetermined image processing, defect correction, and the like on the image signal output from the signal processing circuit 804. A memory circuit 807 and a recording circuit 808 are recording media such as a non-volatile memory or a memory card that records and holds an image signal or the like output from the overall control/arithmetic circuit 806.

An operation circuit 809 receives signals from operation members provided on the image capturing apparatus 800 and transmits the user's command to the overall control/ arithmetic circuit 806. A display circuit 810 displays an image after shooting, a live view image, various setting screens, and the like.

OTHER EMBODIMENTS

The present invention may be applied to a system composed of a plurality of devices or a device composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-032191, filed on Feb. 27, 2020 which is hereby incorporated by reference herein in its entirety.

What is claimed is:
1. An image sensor comprising:
a pixel array having a plurality of pixels arranged in a matrix;
a readout unit that controls readout of signals from the plurality of pixels;
an output unit that outputs the read signals as an image signal; and
an extraction unit that performs feature amount extraction processing to extract a feature amount using the read signals,
wherein the readout of the signals by the readout unit and the feature amount extraction processing by the extraction unit are processed in parallel, and
wherein each unit is implemented by one or more processors, circuitry or a combination thereof.
2. The image sensor according to claim 1, wherein the extraction unit starts the feature amount extraction processing at least in a period since signals necessary for the feature amount extraction processing are read out until the signals are read out from all of the pixel array.
3. The image sensor according to claim 2, wherein the feature amount extraction processing is processing using a convolutional neural network,
the readout unit reads the signals in unit of row, and
the extraction unit starts the feature amount extraction processing after the signals of a number of rows equal to or greater than a size of row of the kernel used in the convolutional neural network are read out.
4. The image sensor according to claim 3, wherein the readout unit reads out the signals by a plurality of rows, and
the size of row of the kernel is an integral multiple of the plurality of rows.
5. An image capturing apparatus comprising:
an image sensor including:
a pixel array having a plurality of pixels arranged in a matrix;
a readout unit that controls readout of signals from the plurality of pixels;
an output unit that outputs the read signals as an image signal; and
an extraction unit that performs feature amount extraction processing to extract a feature amount using the read signals; and
a signal processing unit that processes signals output from the image sensor,
wherein the readout of the signals by the readout unit and the feature amount extraction processing by the extraction unit are processed in parallel, and
wherein each unit is implemented by one or more processors, circuitry or a combination thereof.
6. The image capturing apparatus according to claim 5, wherein the signal processing unit sets a plurality of regions including a first region and a second region in the pixel array using the feature amount extracted by the extraction unit.
7. The image capturing apparatus according to claim 6, wherein the extraction unit performs different types of feature amount extraction processing on the first region and the second region, respectively.
8. The image capturing apparatus according to claim 6, wherein the extraction unit gives different priority to the first region and the second region upon performing the feature amount extraction processing.
9. The image capturing apparatus according to claim 8, wherein the readout unit reads out the signals by using different thinning rates when thinning readout is performed, different numbers of addition averaging pixels when adding and averaging the signals, or different frame rates, at least, between the first region and the second region.
10. The image capturing apparatus according to claim 6, wherein the signal processing unit detects a predetermined subject based on the feature amount, and
the extraction unit further generates marking data that indicates an area of the subject.
11. An image capturing apparatus comprising:
an image sensor including:
a pixel array having a plurality of pixels arranged in a matrix;
a readout unit that controls readout of signals from the plurality of pixels; and
an output unit that outputs the read signals as an image signal; and
an extraction unit that performs feature amount extraction processing to extract a feature amount using the read signals, wherein the readout of the signals by the readout unit and the feature amount extraction processing by the extraction unit are processed in parallel, and wherein each unit is implemented by one or more processors, circuitry or a combination thereof.

12. The image capturing apparatus according to claim 11, wherein the extraction unit starts the feature amount extraction processing at least in a period since signals necessary for the feature amount extraction processing are read out until the signals are read out from all of the pixel array.

13. The image capturing apparatus according to claim 12, wherein the feature amount extraction processing is processing using a convolutional neural network, the readout unit reads the signals in unit of row, and the extraction unit starts the feature amount extraction processing after the signals of a number of rows equal to or greater than a size of row of the kernel used in the convolutional neural network are read out.

14. The image capturing apparatus according to claim 13, wherein the readout unit reads out the signals by a plurality of rows, and the size of row of the kernel is an integral multiple of the plurality of rows.

15. The image capturing apparatus according to claim 11 further comprising a signal processing unit that sets a plurality of regions including a first region and a second region in the pixel array using the feature amount extracted by the extraction unit.

16. The image capturing apparatus according to claim 15, wherein the extraction unit performs different types of feature amount extraction processing on the first region and the second region, respectively.

17. The image capturing apparatus according to claim 16, wherein the feature amount extraction processing is processing using a convolutional neural network, and the extraction unit uses different number of types of kernels, different sizes of the kernel, different slide amounts of the kernel, or different pooling methods in a pooling layer, at least, for the first region and the second region.

18. The image capturing apparatus according to claim 15, wherein the extraction unit gives different priority to the first region and the second region upon performing the feature amount extraction processing.

19. The image capturing apparatus according to claim 15, wherein the readout unit reads out the signals by using different thinning rates when thinning readout is performed, different numbers of addition averaging pixels when adding and averaging the signals, or different frame rates, at least, between the first region and the second region.

20. The image capturing apparatus according to claim 15, wherein the signal processing unit detects a predetermined subject based on the feature amount, and the extraction unit further generates marking data that indicates an area of the subject.

21. A method of controlling an image sensor including a pixel array having a plurality of pixels arranged in a matrix, a readout unit that controls readout of signals from the plurality of pixels, an output unit that outputs the read signals as an image signal, and an extraction unit that performs feature amount extraction processing to extract a feature amount using the read signals, the method comprising controlling to perform the readout of the signals by the readout unit and the feature amount extraction processing by the extraction unit in parallel.

22. A control method of an image capturing apparatus having an image sensor including a pixel array having a plurality of pixels arranged in a matrix, a readout unit that controls readout of signals from the plurality of pixels and an output unit that outputs the read signals as an image signal, and an extraction unit that performs feature amount extraction processing to extract a feature amount using the read signals, the method comprising controlling to perform the readout of the signals by the readout unit and the feature amount extraction processing by the extraction unit in parallel.

23. A non-transitory computer-readable storage medium, the storage medium storing a program that is executable by the computer, wherein the program includes program code for causing the computer to perform a control method of controlling an image sensor including a pixel array having a plurality of pixels arranged in a matrix, a readout unit that controls readout of signals from the plurality of pixels, an output unit that outputs the read signals as an image signal, and an extraction unit that performs feature amount extraction processing to extract a feature amount using the read signals, the method comprising controlling to perform the readout of the signals by the readout unit and the feature amount extraction processing by the extraction unit in parallel.

24. A non-transitory computer-readable storage medium, the storage medium storing a program that is executable by the computer, wherein the program includes program code for causing the computer to perform a control method of controlling an image capturing apparatus having an image sensor including a pixel array having a plurality of pixels arranged in a matrix, a readout unit that controls readout of signals from the plurality of pixels and an output unit that outputs the read signals as an image signal, and an extraction unit that performs feature amount extraction processing to extract a feature amount using the read signals, the method comprising controlling to perform the readout of the signals by the readout unit and the feature amount extraction processing by the extraction unit in parallel.

* * * * *